Sept. 1, 1953 A. U. BRYANT 2,650,607
GAS FLOW CONTROL APPARATUS
Filed Feb. 23, 1949 3 Sheets-Sheet 1
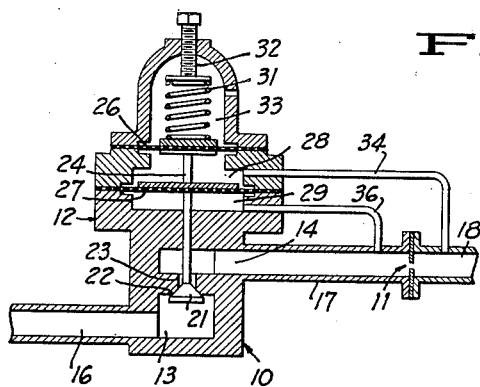
FIG_1_
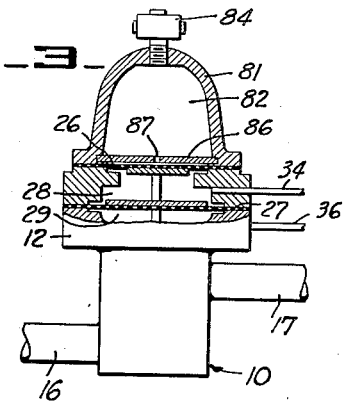
FIG_3_
FIG_2_
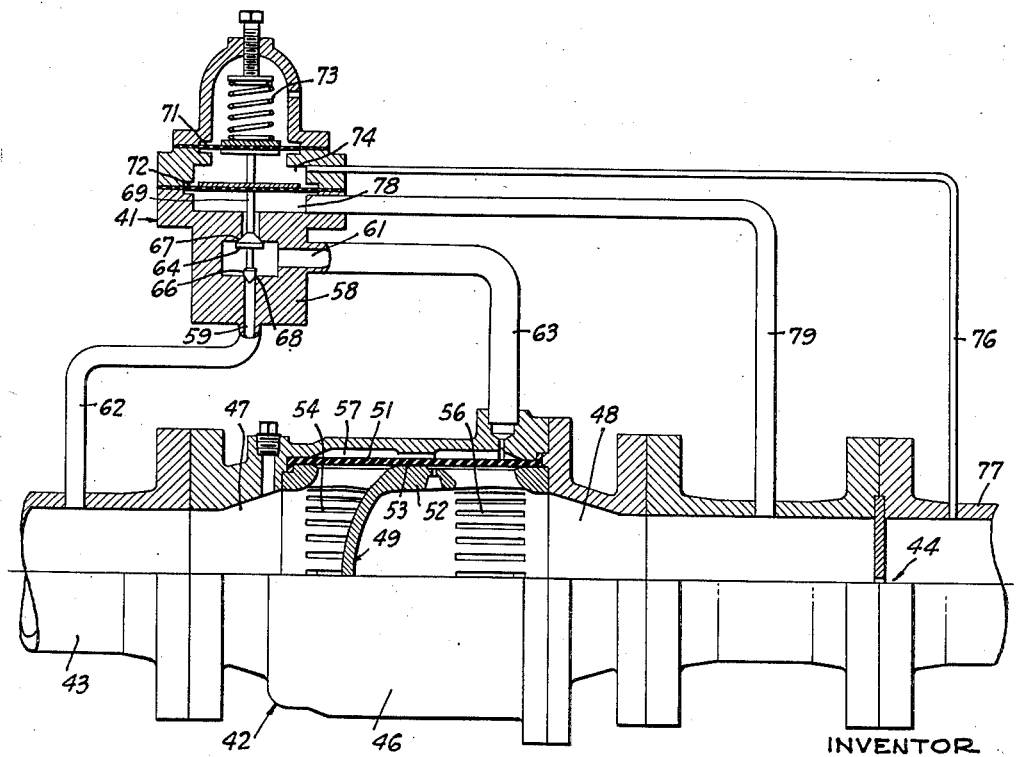
INVENTOR.
Austin U. Bryant
BY
ATTORNEYS Sept. 1, 1953      A. U. BRYANT      2,650,607
GAS FLOW CONTROL APPARATUS
Filed Feb. 23, 1949      3 Sheets-Sheet 2
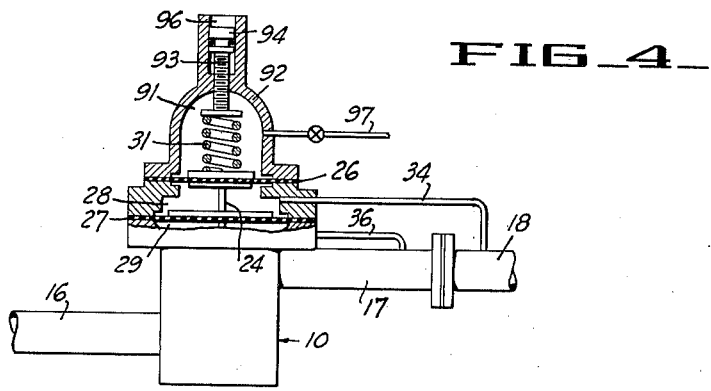
FIG_4_
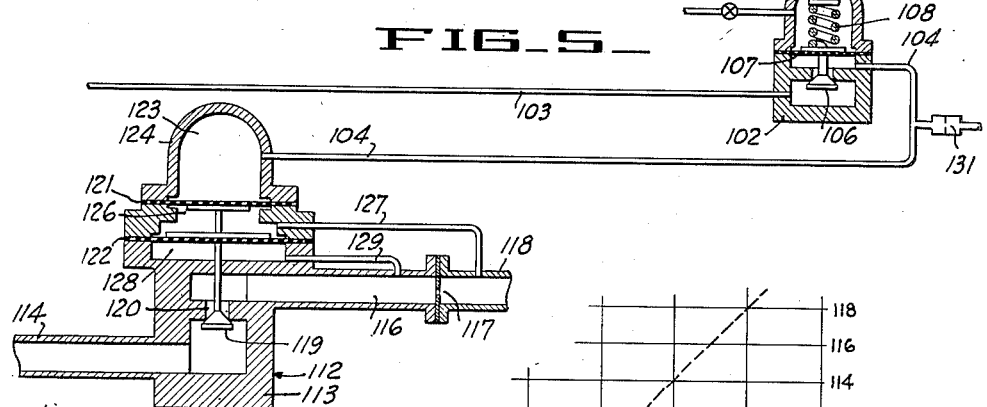
FIG_5_
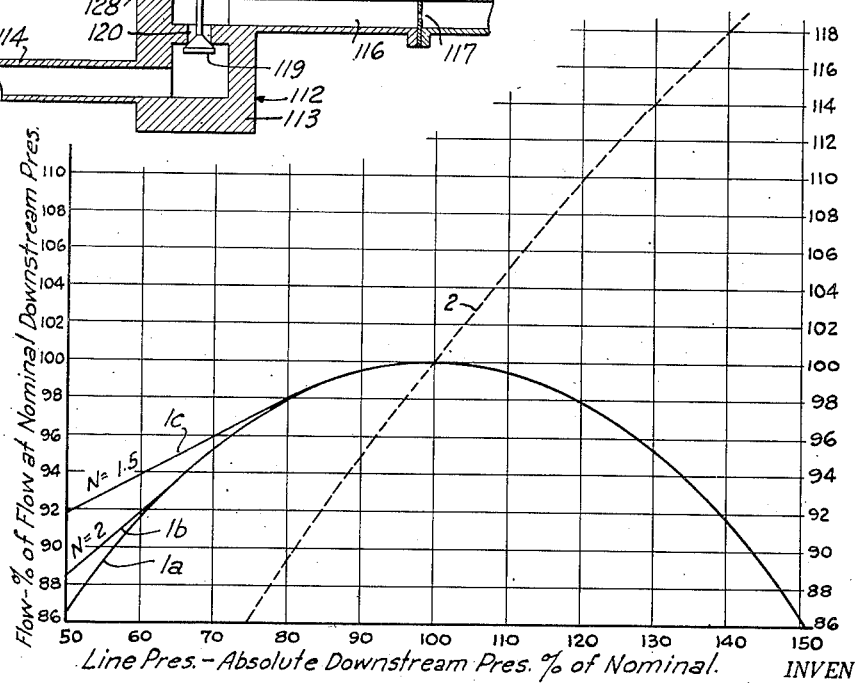
FIG_6_
INVENTOR.
Austin U. Bryant
BY
ATTORNEYS Sept. 1, 1953      A. U. BRYANT      2,650,607
GAS FLOW CONTROL APPARATUS
Filed Feb. 23, 1949      3 Sheets-Sheet 3
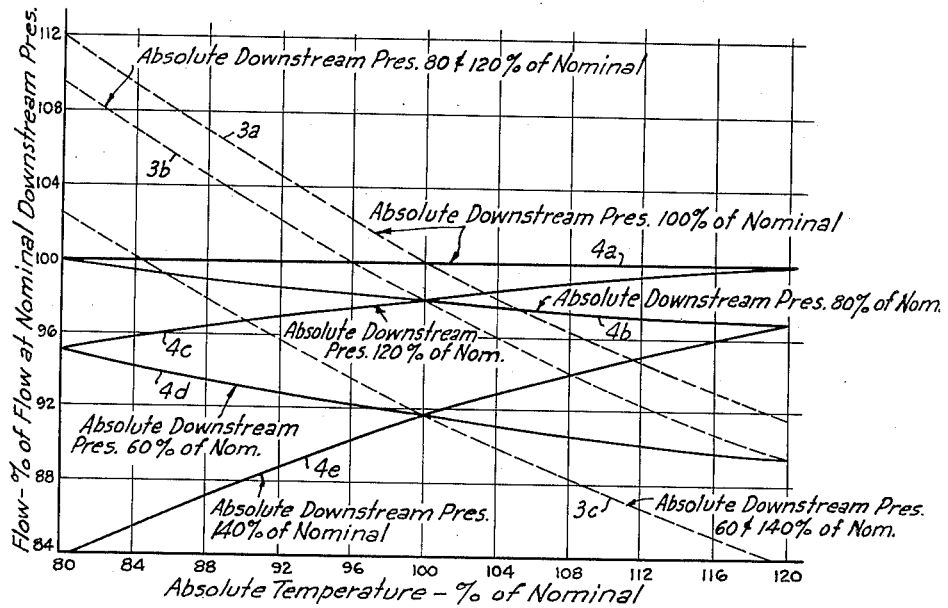
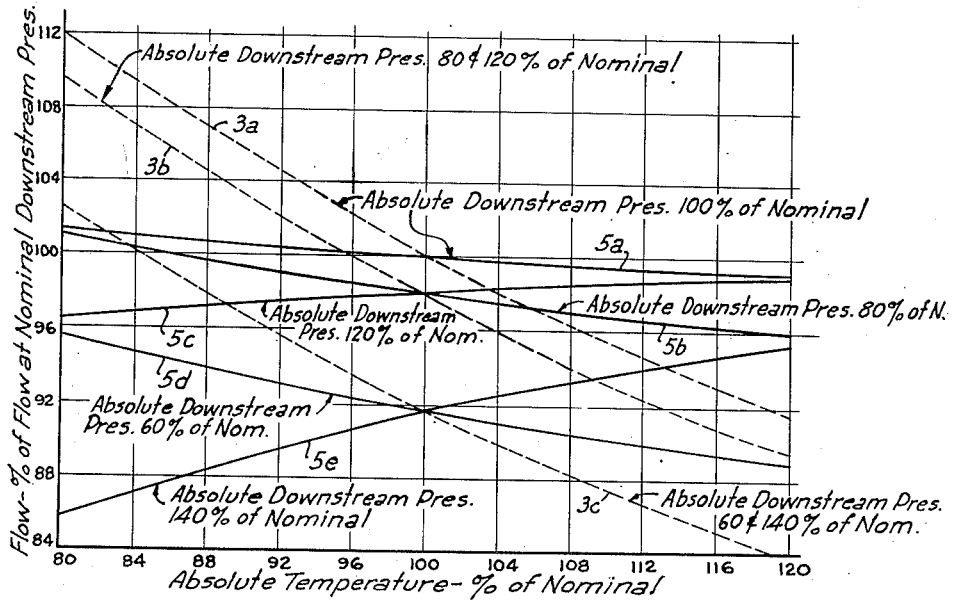
INVENTOR.
Austin U. Bryant
BY
ATTORNEYS Patented Sept. 1, 1953

2,650,607

UNITED STATES PATENT OFFICE 2,650,607

GAS FLOW CONTROL APPARATUS

Austin U. Bryant, Berkeley, Calif., assignor, by mesne assignments, to M & J Engineering Co., a partnership Application February 23, 1949, Serial No. 77,880

6 Claims. (Cl. 137—468)

1

This invention relates generally to apparatus for controlling the flow of various gases.

In many instances it is desirable to provide a substantially constant flow rate of gas to a point of gas demand. For example where fuel gases such as acetylene, hydrogen, or natural gas are supplied to a torch or burner, it is desirable to provide automatic means which will maintain the flow rate substantially constant. By constant flow rate I have reference to flow in which the weight of gas per unit of time is constant.

In the past automatic flow rate control apparatus has been relatively expensive and complicated, and has not been suited to many applications where the apparatus for flow control must be relatively simple in construction and operation. Thus such constant flow rate apparatus has been used only in the more elaborate and expensive installations, and they have not been used for many applications where constant flow rate control would be desirable. In addition apparatus of this character which has been available in the past has not provided protection against excessive pressures, unless supplemental pressure relief or pressure limiting valves are employed.

It is an object of the present invention to provide a gas flow control apparatus capable of supplying gas to a point of gas demand at a substantially constant flow rate (i. e. at a rate whereby the weight of gas flowing per unit of time remains constant), and without serious inaccuracies due to fluctuations in the gas pressure, within a reasonable range above and below a nominal mean pressure.

Another object of the invention is to provide apparatus of the above character which will automatically serve as a pressure limiter to shut off further flow of gas from the high pressure source when the gas pressure at the point of demand increases to a predetermined value above the nominal mean, due to interruption of gas consumption.

Another object of the invention is to provide flow control apparatus of the above character having provision for temperature compensation.

Another object of the invention is to provide a flow control device which in many instances may take the place of pressure reducing regulators.

Additional objects of the invention will appear from the following description in which the preferred embodiments have been set forth in detail in conjunction with the accompanying drawing.

Referring to the drawing:

Figure 1 is a schematic side elevational view in section, illustrating apparatus incorporating the present invention.

2

Figure 2 is a side elevational view illustrating another embodiment of the invention in which both main and pilot valves are employed.

Figure 3 is a cross-sectional detail showing a modification of the invention in which gas loading is used in place of a compression spring.

Figure 4 is a cross-sectional view, in elevation, showing an embodiment of the invention in which both gas and spring loading forces are employed, in order to secure temperature compensation.

Figure 5 is a sectional view in side elevation, showing another embodiment of the invention in which an auxiliary pilot, loaded by the use of gas pressure and a compression spring, is employed for the purpose of controlling operation of the flow control device.

Figure 6 is a curve serving to illustrate the manner in which my device operates.

Figures 7 and 8 are further illustrative curves which facilitate an understanding of my invention.

In general the present invention makes use of flow control valve means adapted to be connected to a source of gas under pressure, and which is connected on its outflow side to a flow restricting orifice. Downstream piping connects to the outlet side of the orifice, and serves to distribute the gas to one or more points of gas demand. Means is provided for effecting operation of the flow control valve whereby over a range of downstream pressures extending above and below a given nominal mean value, the rate of flow of gas (i. e. weight of gas flow per unit of time) to the downstream piping is substantially constant. This is accomplished by effecting operation of the flow control valve responsive to both the pressure differential across the orifice, and the static pressure in the downstream piping. In general the apparatus employs two fluid pressure operated diaphragms or like members, one actuated by the pressure drop across the floor orifice and the other by the pressure downstream from the orifice.

That form of the invention illustrated in Figure 1 consists of a flow control device designated generally at 10, together with a flow control orifice 11. The device 10 in this instance consists of a body 12 having inlet and outlet passages 13 and 14, which are shown connected to the pipes 16 and 17 respectively. Pipe 16 serves to connect to a source of gas under pressure, while pipe 17 connects to the inlet side of the orifice 11. The outlet side of the orifice connects with the piping 18, which can be termed the downstream piping, and which serves to distribute the gas to one or more points of gas demand.

Within the body 12 there is a movable valve member 21, cooperating with the stationary seat 22. When the valve member is in open or partially open position, gas may flow from the inlet 13 through the seat orifice 23, to the outlet passage 14. Valve member 21 is attached to the valve stem 24, which in turn operatively connects with the fluid pressure operated members 26 and 27. In this instance members 26 and 27 are in the form of flexible diaphragms. The mounting means for these diaphragms serves to form two fluid chambers 28 and 29, the chamber 28 being between the diaphragms 26 and 27, and the chamber 29 being below the diaphragm 27. Loading means is provided for the diaphragm 26, which in this instance is a compression spring 31. By turning the screw 32, the loading can be adjusted as desired. The space 33 above the diaphragm 26 may be vented to the atmosphere as illustrated.

Pipe 34 forms a pressure transmitting connection between the chamber 28 and the downstream piping 18. Pipe 36 connects the chamber 29 with the inflow side of the orifice 11, or in other words, to the outflow side of the flow control valve 10.

In general operation of the apparatus described above is as follows: It will be presumed that pipe 16 is connected to a source of gas under pressure, that the valve member 21 is in intermediate or partially open position, and that the static pressure in piping 18 and being transmitted through pipe 34, is at a mean value. The device will now maintain a constant pressure drop across the orifice 11. If the pressure drop across the orifice tends to increase slightly, spring 31 is compressed and valve member 21 moves upwardly to reduce the flow through the valve orifice 23 in order to maintain the desired pressure drop across the orifice. If the pressure drop across the orifice 11 should tend to decrease, the reverse operation takes place.

Assuming now that the pressure in piping 13 (i. e. on the downstream side of the orifice 11) increases a certain amount, less differential pressure will be required across the diaphragm 27 to balance the force of spring 21, and therefore the device will maintain a lower differential pressure drop across the orifice 11. By proper selection of diaphragm areas, this decrease in differential pressure across the orifice 11 may be made to compensate for the increased flow which would normally be caused by the increased line pressure, thus making it possible to maintain an approximately constant flow rate, that is, a flow in which the weight of gas flow per unit of time remains constant.

The rate of flow of gas through an orifice, when the pressure drop through the orifice is less than the absolute downstream pressure, is proportional to the square root of the product of the pressure drop and the downstream absolute pressure. A constant rate of flow (in terms of weight of gas per unit of time) is maintained if the product of the pressure drop and the downstream absolute pressure is maintained constant. If the downstream pressure is either increased or decreased by a small amount, such as say 1%, and the pressure differential is changed in the other direction by the same percentage, the product will remain very nearly the same. Greater variations will cause such product to be slightly less than the original value. This relationship is illustrated by the solid line curve 1a of Figure 6, which is plotted between the absolute pressure on the downstream side of orifice 11 (in terms of percent of a nominal value) and the rate of gas flow (in terms of percent of flow at nominal mean pressure) for the device of Figure 1. In contrast with the solid line curve of this figure the dotted curve 2 shows the flow variation which would be obtained with a flow control device which did not have the upper diaphragm 26, that is, a flow control device of conventional design adapted to maintain the pressure differential across the orifice 11 at a constant value, but which does not compensate for variations in downstream pressure.

Referring to the solid line curve 1a of Figure 6, for say a 10% increase or decrease in the absolute pressure, from the nominal mean (100%), the product of the pressure drop across the orifice 11 and the downstream absolute pressure is about 1% less than the original optimum value, which would provide about an 0.5% decrease in the rate of flow from the nominal mean rate (100%). A 20% pressure change of the downstream pressure from the nominal mean would provide about a 2% decrease in the flow rate. For a complete range of pressures between 20% below nominal value, to 20% above, the total flow variation is between 98% and 100%, or namely 2%.

In contrast with the results obtained with my flow control device, the dotted line of Figure 6 for a conventional flow controller shows that for a complete range of pressures between 20% below nominal value to 20% above, there is a variation between 89.4 to 109.6%, or namely a variation of 20.2% for the same or comparable conditions.

The proper areas of diaphragms 26 and 27, which make possible the compensation illustrated by the solid line curves of Figure 6 are areas which make the product of the average downstream absolute pressure and the upper diaphragm effective area equal the product of the average orifice differential pressure and the lower diaphragm effective area. In other words, the diaphragm effective areas are made inversely proportional to the ratio of the orifice differential pressure to the downstream absolute pressure, at the mean downstream operating pressure.

By way of example it may be assumed that one desires to control the rate of flow using a device corresponding to Figure 1, with the diaphragms 26 and 27 proportioned to provide a ratio between effective diaphragm areas of 1 to 5. Also assuming that the mean value of the downstream pressure is 35.3 p. s. i. gage or 50 p. s. i. absolute, the compression spring 31 should be adjusted to balance this downstream pressure with a 10 p. s. i. differential across the diaphragm 27. When the pressures mentioned are established, the rate of flow (i. e. the weight of gas per unit of time) is determined by the size of the orifice 11. The maximum flow rate will be obtained when the downstream pressure is the set mean or nominal operating pressure. The flow rate will fall off very slightly at first, and then more rapidly as the pressure on the downstream side of the orifice 11 is either increased or decreased from the set mean operating pressure.

In actual practice the flow in terms of weight of gas per unit of time is normally set by adjusting the size of the orifice 11, either by means of an adjustable orifice or by changing the orifice plates. However a certain amount of flow rate adjustment can be made by adjusting the tension of the spring 31. This also serves to change the nominal or mean pressure setting, but if the allowable range of pressure variation is greater than the actual variation, a change in the tension of the spring can be employed to vary the nominal flow rate a certain amount.

Assuming that the device is set for a nominal downstream absolute pressure of 50 p. s. i. as in the above example, and assuming that the allowable pressure variation on the downstream side of the orifice is plus or minus 20% or from 40 to 60 p. s. i., this total pressure range will provide a total flow variation of 2%, that is, plus or minus 1% from the mean flow rate. Also assuming that the pressure actually only fluctuates plus or minus 10%, or from 45 to 55 p. s. i., one may increase the mean flow rate 12% or decrease it 8% by adjusting spring 31 and still remain within the allowable pressure range. Thus if the tension of spring 31 were increased to increase the balancing force by 12%, which would afford 12% more flow, the nominal downstream pressure would become 56 p. s. i. absolute and the allowable range would be 56 plus or minus 20% or from 45 to 67 p. s. i. If the tension of spring 31 were decreased to decrease the balancing force by 8%, thus reducing the flow rate 8%, the allowable pressure range would become 46 p. s. i. plus or minus 20%, or from 37 to 55 p. s. i. Both of these ranges include the actual pressure variation range of from 45 to 55 p. s. i. absolute.

One novel feature of my device, which has useful applications, is its ability to limit pressure as well as to control flow rate. As previously explained, the orifice differential decreases from the nominal value by the same percentage as the downstream absolute pressure is increased; hence when the downstream pressure is increased 100% or doubled, the orifice differential will become zero and there will be no flow. In other words twice the nominal absolute pressure applied to the upper diaphragm will always balance the pressure of spring 31 and cause closure of the valve 21. Therefore when the downstream line 18 is shut off completely, the pressure may build up to double the nominal value, but there can be no further increase in pressure, due to closure of the valve 21.

The pressure limiting feature of the device described above has useful application when the device is employed to regulate supply of gas to cutting or welding torches of the oxyacetylene type. A suitable metering valve can be employed in place of a fixed orifice 11, to enable adjustment of the flow rate. When the gas valve on the torch is opened, my controller will maintain a constant flow rate (i. e. the weight of gas per unit of time) of oxygen or acetylene to the torch, regardless of minor variations in the flow resistance of the torch. When the valve on the torch is closed, the device will automatically shut off flow when the pressure reaches double the nominal absolute value, thus limiting the pressure to a safe value to avoid bursting the connecting hose.

Although increasing the downstream pressure by 100% reduces the flow to zero, reducing the downstream pressure by 100% or to zero does not correspondingly reduce the flow to zero. When the downstream pressure drops below the critical value where the orifice differential pressure equals the downstream absolute pressure, a different formula must be applied. The flow then becomes proportional to one-half of the upstream absolute pressure. The flow rate falls off linearly with decrease in downstream pressure below the critical value. Therefore the flow rate does not fall off to zero when the downstream pressure is reduced to absolute zero.

The relation between the critical value of the downstream absolute pressure and the nominal mean value depends upon the ratio between the effective areas of the two diaphragms. This ratio is the same as the ratio between the nominal mean values of the absolute downstream pressure and the orifice differential pressure, and is designated by symbol N on the curves in Figure 6.

The apparatus of Figure 1 is of the direct acting type, that is the diaphragms 26 and 27 operate a valve member which directly controls flow of gas to the orifice 11. In place of such a direct acting arrangement it is possible to use an arrangement of two valve devices such as shown in Figure 2. In this instance a pilot control device 41 corresponds generally to the device of Figure 1, and is connected to control the operation of a primary or main valve device 42. The main valve has its inlet connected to the gas supply line 43 and its outlet connected to the orifice 44. A satisfactory type of primary valve is one of the expansible tube type, such as disclosed in Patents 2,331,291, 2,353,143 and 2,360,873.

Briefly, the valve 42 consists in this instance of a body 46 having inflow and outflow passages 47 and 48 and provided with the inner rigid core 49. Surrounding the core there is a tube 51 formed of suitable resilient material such as natural or synthetic rubber. The core 49 includes an annular barrier 52 intermediate its ends, which has a peripheral surface 53 against which the tube 51 is adapted to contract and seal. The end portions of the core are proviedd with slots 54 and 56 through which flow occurs past the barrier 52, when the tube 51 is expanded. An annular chamber 57 surrounds the tube 51, and fluid pressure applied to this chamber serves to collapse the tube. The tube 51 is normally stressed so that when not subjected to fluid pressures, it contracts and seals upon the peripheral sealing surface 53.

The body 58 for the pilot valve device 41 is provided with passages 59 and 61, which are connected by pipes 62 and 63 to the inlet pipe 43, and the chamber 57 respectively. Within the body 58 there is a movable valve member 64 to which is connected a tapered flow control member 66. These members cooperate with stationary seats 67, 68. The stem 69 to which the members 64 and 66 are both attached is operatively connected to the diaphragms 71 and 72, corresponding to the diaphragms 26 and 27 of Figure 1. The diaphragm 71 is urged downwardly by the adjustable loading spring 73. The chamber 74 between the diaphragms 71 and 72 is connected by a pipe 76 to the downflow piping 77. The chamber 78 is connected by piping 79 with the inflow side of orifice 44.

The positioning of members 64 and 66 determines operation of the main valve 42. When the valve member 64 is closed, member 66 is raised with respect to its seat 68, and therefore inlet pressure is applied through pipe 62 to the pipe 63 and to the chamber 57 about the tube 51. As a result the tube 51 is maintained collapsed and closed upon the barrier 52. When valve member 64 is moved to partially open position, gas in chamber 57 may vent through pipe 63, flow about member 64, and through pipe 79 to the outflow side of the primary valve. At the same time communication between pipes 62 and 63 is restricted by the positioning of member 66 and its associated seat 68. Application of pressure from pipe 43 against the tube 51 causes this tube to expand to permit flow of gas past the barrier and through the orifice 44. Controlled positioning of valve member 64, together with flow controlling member 66, serves in the same manner as with the device of Figure 1 to regulate the opening and closing of the expansible tube valve 42. In other words the rate of flow (in terms of weight of gas per unit of time) to the downstream piping 77 is maintained substantially constant over a substantial downflow pressure range plus or minus from a given nominal mean value, and at the same time the apparatus serves as a limiter, in that if the consumption of gas is discontinued, the expansible tube valve 42 is closed when the pressure in the downstream piping attains substantially double the mean absolute pressure.

In the two types of apparatus illustrated in Figures 1 and 2, a spring is utilized for the purpose of securing the desired adjustable loading. In place of utilizing a loading spring it is possible to use gas pressure loading as illustrated in Figure 3. In this instance a pressure dome 81 is sealed with respect to the diaphragm 26, and its inner chamber 82 is adapted to contain gas under pressure to provide the desired loading force upon the diaphragm. A suitable fitting 84 can be provided to facilitate introduction or venting off of gas to adjust the loading, and which may be constructed as disclosed in Patent 2,365,172 or as in Patent 2,519,333. The dome 81 is also shown fitted with a rigid dome plate 86, which closely overlies the diaphragm 26, and which is provided with a small orifice 87 communicating between the chamber 82 and the relatively small space between the plate 86 and the diphragm 26. The use of this dome plate serves to apply restraining forces to movements of the diaphragm 26 and thus prevents erratic operation, such as chattering.

With the embodiments of Figures 1 and 2 a substantial change in the flow rate occurs in response to a change in the temperature of the gas. The flow rate is virtually inversely proportional to the square root of the absolute temperature. In those embodiments the diaphragms have a substantially constantly balancing force, which is not varied with changes in temperature.

In the embodiment of Figure 3 the balancing force is obtained by trapped air under pressure, and therefore it changes responsive to a change in temperature of the gas, assuming that the gas is in heat conductive relation with the gas being controlled through the metal body. With this embodiment, if the downstream pressure remains constant, an increase in over-all temperature will cause the differential pressure across the orifice 11 to increase in order to balance the increased loading force of the trapped air. This tends to provide an increase in the flow rate, which in turn tends to offset the decrease which would normally accompany an increase in temperature. Actually the embodiment of Figure 3 does not give proper temperature correction, but provides an over-correction responsive to temperature changes.

I have found that effective temperature correction can be had by utilizing the arrangement of Figure 4. The loading force upon the diaphragm 26 is obtained in this instance by the use of both the compression spring 31, and trapped gas under pressure in the chamber 91 of the dome 92. The force exerted by spring 31 can be adjusted by turning the adjusting screw 93, which has a plunger 94 attached to its outer end. This plunger is slideably disposed and sealed within the cylindrical bore 96. A valve controlled pipe 97 facilitates introduction of air or gas under pressure into the chamber 91, or a venting off of air or gas to provide the desired amount of gas loading.

Assuming that the spring 31 of Figure 4 provides a constant loading force for a given setting, the air or gas pressure in chamber 91 varies directly with the absolute temperature of this gas. Assuming that the dome 92 and the gas in the chamber 91 will take a temperature corresponding generally to the temperature of the gas flowing to the device, then substantially 100% correction will be obtained by making the pressure in the chamber 91 equal to the nominal downstream pressure, and providing the rest of the balancing force by the compression of spring 31.

The compensation described above in connection with Figure 4 will afford substantially perfect correction for almost all variations in temperature as long as the downstream pressure remains at the nominal mean value. The compensation fails only when the conditions are such as to result in an orifice differential pressure which is greater than the absolute downstream pressure. Assuming however that the downstream absolute pressure varies, in addition to the temperature, there will be a small combined error as shown graphically by the curves of Figure 7. The curves of Figure 7 have been drawn for a setting of the device shown in Figure 4 to provide 100% temperature compensation. Figure 8 shows a set of curves similar to Figure 7, with the device of Figure 4 adjusted for 90% temperature compensation. In other words the absolute pressure in the chamber 91 is made to be 90% of the mean absolute downstream pressure, in place of 100% for the curves of Figure 7.

The dotted line curves of 3a, 3b and 3c of Figure 7 illustrate the effect of temperature changes upon a device as shown in Figure 1, which does not have compensation for temperature changes. Curve 3a is drawn for absolute downstream pressure which is 100% of nominal, curve 3b for absolute downstream pressure which is either 80% or 120% of nominal, and curve 3c for absolute downstream pressure which is either 60% or 140% of nominal. It will be noted that all of these curves represent substantial variations in flow rate (in terms of weight of gas per unit of time) with changes in temperature.

The solid line curve 4a represents an adjustment for 100% temperature compensation as mentioned above, and where the absolute downstream pressure is 100% of nominal. Note that this is a straight horizontal line, thus illustrating that the temperature compensation is 100% for an absolute temperature range of from 80 to 120%. Solid line curve 4b illustrates the error obtained in compensation when the downstream pressure is 80% of nominal, and the temperature varied from 80 to 120%. Curve 4c represents the error in the compensation when the absolute downstream pressure is made 120% of nominal, and the temperature of the gas varied over the same range. While both curves 4b and 4c illustrate errors in compensation, the errors are not as serious as the error indicated by the curve 3b.

Curves 4d and 4e illustrate how the temperature compensation is subject to more serious error when the absolute downstream pressure is made 60% of nominal, and 140% of nominal respectively.

It will be evident from Figure 7 that where the downstream pressure does not vary over a wide range plus or minus the nominal mean value, temperature compensation will be relatively effective and accurate, and will be substantially 100% accurate for a constant mean downstream pressure.

Where the downstream pressure will vary over a substantial range above and below the nominal mean value, more accurate over-all temperature compensation can be obtained by adjusting the device of Figure 4 for somewhat less than 100% temperature compensation, as for example 90% compensation. Thus referring to the curves of Figure 8, curves $3a$, $3b$ and $3c$ are the same as Figure 7. Curves $5a$, $5b$, $5c$, $5d$ and $5e$, have been drawn for an adjustment to provide 90% rather than 100% temperature compensation, and for the same absolute downstream pressures as curves $4a$ to $4e$ inclusive of Figure 7.

It is possible to employ temperature compensation as incorporated in Figure 4, in apparatus including both pilot and main valve devices. Thus as shown in Figure 5 there is a pilot valve 101, comprising a body 102, connected to the inlet and outlet piping 103 and 104. The valve member 106 within the body 102 is operatively connected to the diaphragm 107. Loading forces are applied to this diaphragm by the adjustable compression spring 108, and by trapped air under pressure in the chamber 109 of the dome 111. The characteristics of the pilot 101 can be similar to the arrangement of Figure 4, except for the omission of diaphragm 27.

The main valve 112 consists of a body 113, which is connected to the inflow and outflow piping 114, 116. Piping 116 is provided with the flow control orifice 117, which discharges into the downflow piping 118. Valve member 119 controls flow of gas through the seat orifice 120, and is connected to the two diaphragms 121 and 122. Diaphragm 121 is loaded by gas pressure in the chamber 123 of the dome 124. The space 126 between the diaphragms 121 and 122 is in communication by pipe 127 with the downflow side of orifice 117. The space 128 below the diaphragm 122 is connected by pipe 129 with the inlet side of orifice 117. Diaphragms 121 and 122 can be proportioned in the same manner as previously described with reference to Figure 1. The chamber 123 is connected by pipe 104 to the pilot device 101, and this pipe is also provided with a fixed bleed-off orifice 131. Pipe 103 of the pilot device connects to a convenient source of gas under pressure. The pilot device 101 can be adjusted for temperature compensation in the same manner as previously described in connection with Figure 4. Preferably the temperature compensation is of the order of 90%.

The principles involved in operation of my invention can be illustrated by the use of certain mathematical equations. The symbols used in the equations subsequently set forth, are as follows:

$P_2$ is the actual absolute pressure downstream from the orifice.

$P_d$ is the actual pressure drop across the orifice which the controller maintains.

T is the actual absolute temperature of the flowing gas. It is assumed in the case of the controller compensated for temperature that provision is made for maintaining the compensating element at the temperature of the flowing gas.

Q is the actual flow rate maintained by the controller in volume at standard conditions per unit time, or in mass per unit time.

$P_{2n}$ is the nominal mean value of $P_2$.

$P_{dn}$ is the nominal mean value of $P_d$.

$T_n$ is the nominal mean value of T.

$Q_n$ is the value of Q maintained when $P_2 = P_{2n}$ and $T = T_n$.

$\alpha$ is the per unit variation of $P_2$ from its nominal mean value of $P_{2n}$ $$P_2 = (1+\alpha) P_{2n}$$

$\beta$ is the per unit variation of T from its nominal mean value of $T_n$ $$T = (1+\beta) T_n$$

$\alpha_c$ is the critical value of $\alpha$. It is that value of $\alpha$ which makes $P_d$ equal to $P_2$.

R is the ratio of diaphragm areas in the improved flow controller. It is the effective fluid pressure area of the lower (larger) diaphragm divided by the effective fluid pressure area of the upper (smaller) diaphragm.

N is the ratio of $P_{2n}$ to $P_{dn}$.

X is the absolute pressure in the sealed loading chamber, measured when T equals $T_n$, divided by $P_{2n}$. This applies only to the controller when provided with temperature compensation. X is referred to as the fraction of compensation.

The following basic equations can be employed to determine the flow rate of gas through an orifice, for given values of temperature and pressure.

When $P_2$ is equal to or greater than $P_d$ (1) $$Q = k\left(\frac{T_n}{T}\right)^{\frac{1}{2}} (P_d P_2)^{\frac{1}{2}}$$

When $P_2$ is equal to or less than $P_d$ (2) $$Q = k\left(\frac{T_n}{T}\right)^{\frac{1}{2}} \frac{(P_d + P_2)}{2}$$

In the above basic equations $k$ is a constant depending upon the orifice size and characteristics, and the constant of the gas employed.

The equations involved for the operation of a conventional flow controller, which maintains a constant differential pressure across a flow orifice without compensating for changes in downstream pressure are as follows:

(3) $$P_2 = (1+\alpha) P_{2n}$$

(4) $$P_d = P_{dn} = \text{Const.}$$

(5) $$\alpha_c = -\frac{N-1}{N}$$

$\alpha$ can assume any value from minus 1 and greater.

When $\alpha$ is equal to or greater than $\alpha_c$ (6) $$\frac{Q}{Q_n} = (1+\beta)^{-\frac{1}{2}}(1+\alpha)^{\frac{1}{2}}$$

When $\alpha$ is equal to or less than $\alpha_c$ (7) $$\frac{Q}{Q_n} = \frac{1}{2}(1+\beta)^{-\frac{1}{2}}\left[N^{-\frac{1}{2}} + (1+\alpha)N^{\frac{1}{2}}\right]$$

When $\alpha = \alpha_c$ (8) $$\frac{Q}{Q_n} = (1+\beta)^{-\frac{1}{2}} N^{-\frac{1}{2}}$$

When $a=-1$ (9) $$\frac{Q}{Q_n}=\frac{1}{2}(1+\beta)^{-\frac{1}{2}}N^{-\frac{1}{2}}$$

The above Equations 3 to 9 inclusive are representative of a conventional controller such as represented by the dotted line curve of Figure 6.

The following additional equations apply to a controller such as illustrated in Figures 1 and 2, which compensates for changes in downstream pressure, without compensating for changes in temperature.

(10) $$P_2=(1+\alpha)P_{2n}$$

(11) $$P_d=(1-\alpha)P_{dn}$$

(12) $$\alpha_c=-\frac{N-1}{N+1}$$

$\alpha$ can assume any value between plus 1 and minus 1. The critical value of $\alpha$, $\alpha_c$, is always a negative number between zero and minus 1. The relation between $Q$ and $Q_n$ follows a different formula for values of $\alpha$ less than $\alpha_c$ than it does for values of $\alpha$ greater than $\alpha_c$. These relations are expressed by the following equations.

When $\alpha$ is equal to or greater than $\alpha_c$

(13) $$\frac{Q}{Q_n}=(1+\beta)^{-\frac{1}{2}}(1-\alpha^2)^{\frac{1}{2}}$$

When $\alpha$ is equal to or less than $\alpha_c$

(14) $$\frac{Q}{Q_n}=\frac{1}{2}(1+\beta)^{-\frac{1}{2}}\left[(1-\alpha)N^{-\frac{1}{2}}+(1+\alpha)N^{\frac{1}{2}}\right]$$

When $\alpha=\alpha_c$

(15) $$\frac{Q}{Q_n}=2(1+\beta)^{-\frac{1}{2}}\frac{N^{\frac{1}{2}}}{N+1}$$

When $\alpha=-1$

(16) $$\frac{Q}{Q_n}=(1+\beta)^{-\frac{1}{2}}N^{-\frac{1}{2}}$$

When $\alpha=+1$

(17) $$\frac{Q}{Q_n}=0$$

The diaphragm area ratio is the same as the nominal mean pressure ratio and therefore N is equal to R.

Equations for my flow controller when employing compensation for both changes in downstream pressure, and changes in temperature (Figures 4 and 5) are as follows:

(18) $$P_2=(1+\alpha)P_{2n}$$

(19) $$P_d=(1-\alpha+X\beta)P_{dn}$$

(20) $$\alpha_c=-\frac{N-1-X\beta}{N+1}$$

$\alpha$ can assume any value between minus 1 and plus $(1+X\beta)$.

When $\alpha$ is equal to or greater than $\alpha_c$, but not greater than $(1+X\beta)$

(21) $$\frac{Q}{Q_n}=\left[\frac{(1-\alpha+X\beta)(1+\alpha)}{1+\beta}\right]^{\frac{1}{2}}$$

When $\alpha$ is equal to or less than $\alpha_c$, but not less than $-1$

(22) $$\frac{Q}{Q_n}=\frac{1}{2}(1+\beta)^{-\frac{1}{2}}\left[(1-\alpha+X\beta)N^{-\frac{1}{2}}+(1+\alpha)N^{\frac{1}{2}}\right]$$

When $\alpha=\alpha_c$

(23) $$\frac{Q}{Q_n}=2(1+\beta)^{-\frac{1}{2}}\left(1+\frac{X\beta}{2}\right)\frac{N^{\frac{1}{2}}}{N+1}$$

When $\alpha=-1$

(24) $$\frac{Q}{Q_n}=(1+\beta)^{-\frac{1}{2}}\left(1+\frac{X\beta}{2}\right)N^{-\frac{1}{2}}$$

When $\alpha=1+X\beta$

(25) $$\frac{Q}{Q_n}=0$$

The diaphragm ratio is again the same as the nominal mean pressure ratio at the mean temperature, and therefore N is equal to R.

As previously stated the ratio between the critical value of the downstream absolute pressure and the nominal mean value depends on the ratio between the effective areas of the two diaphragms 26 and 27 of Figure 1, and between the corresponding diaphragms of the other modifications. This is the same as the ratio of the nominal mean values of the absolute downstream pressure and the orifice differential pressure, and is designated as N on the curves in Figure 6. The branch curves 1b and 1c of Figure 6 are for values of downstream pressure below the respective critical values for $N=2$ and $N=1.5$. For $N=3$ the critical value of the downstream absolute pressure is 50% of the nominal mean value, and is less for larger values of N. Hence corresponding branch curves having N equal to 3 or more than 3 do not appear in Figure 6, because the curves of this figure show only values of absolute downstream pressure down to 50% of nominal. The branch curves 1b and 1c of Figure 6, representing values of downstream pressure below critical, show less variation in flow rate than the main curve 1a. Hence values of flow rate read from the main curve 1a represent the maximum error obtained with a flow controller employing any selected diaphragm ratio.

I claim:

1. In a gas flow control apparatus, a flow control valve means having its inlet side adapted for connection with a source of gas under pressure, a flow control orifice having its inlet side connected to the outlet side of said valve means, downstream piping connecting to the outlet side of the orifice and serving to conduct the gas to a point of gas demand, means responsive to the fluid pressure drop across said orifice for effecting opening and closing of said valve means, a decrease in the pressure drop serving to open the valve means and an increase in the pressure drop serving to close the valve means, and means responsive to the pressure in said downstream piping for modifying the action of said second named means responsive to variations in static pressure at a point in said downstream piping, said last means acting to urge the flow control valve means toward closed position responsive to an increase in static pressure at said point and to urge the same toward open position for a decrease in such static pressure, the combination of said last named means forming means to maintain the weight of gas flowing through said orifice per unit of time constant, when the pressure drop through the orifice is less than the downstream absolute pressure.

2. Apparatus as in claim 1 in which said last named means is responsive to temperature changes of the gas to provide temperature compensation in controlling the gas flow.

3. In a gas flow control apparatus, a pair of fluid pressure operated members providing different fluid pressure areas, said members being connected for conjoint movement, means serving to mount said members to form one fluid chamber between the same and a second fluid pressure chamber on that side of the larger member which is opposite to said first chamber, loading means serving to continuously urge said members toward said second chamber, flow control valve means having its inlet adapted for connection to a source of gas under pressure, a flow control orifice having its inlet side connected to the outlet side of the flow control valve means, downstream piping connected to the outlet side of said orifice, said piping serving to conduct gas to a point of gas demand, separate pressure connections from the outflow and inflow sides of said orifice to said first and second fluid pressure chambers respectively, and means for effecting opening and closing action of said flow control valve means responsive to movements of said fluid pressure operated members, movement of said members responsive to an increase in pressure in the downstream piping serving to effect opening of said valve means, said fluid pressure areas being proportioned relative to each other whereby the flow to the downstream piping in terms of weight of gas per unit of time is maintained substantially constant.

4. Apparatus as in claim 3 in which said loading means is responsive to temperature changes of the gas to vary the loading force in accordance with such changes.

5. Apparatus as in claim 3 in which said loading means comprises both a mechanical spring and a quantity of trapped gas under pressure, said gas being in heat conductive relation to the gas being controlled.

6. In a gas flow controller, a pair of fluid pressure operated members providing different fluid pressure areas and connected for conjoint movement, means serving to mount said members to form a first fluid chamber between said members and a second fluid pressure chamber on that side of the larger member which is opposite to said first chamber, a main gas flow control valve means having its inlet adapted for connection to a source of gas under pressure, said last means including a fluid chamber adapted to receive fluid under pressure to control flow of gas through said valve means, a flow control orifice having its inlet connected to the outlet side of the flow control valve means, downstream piping connected to the outlet side of the orifice, pilot valve means connected to said members, means forming a controlling fluid connection from the pilot valve means to the fluid chamber of said main gas flow control valve means, means for applying a loading force to said fluid pressure operated members to urge the same in a direction which is opposite to the direction in which the members are urged by pressure in said second chamber, whereby fluid pressure controlled by said pilot valve means and applied to said chamber causes said main valve means to open, and separate fluid pressure transmitting connections from the outflow and inflow sides of the orifice to said first and second chambers respectively.

AUSTIN U. BRYANT.

References Cited in the file of this patent

UNITED STATES PATENTS

| Number | Name | Date |
|---|---|---|
| 1,860,516 | Thomas | May 13, 1932 |
| 2,012,978 | Veenschoten | Sept. 3, 1935 |
| 2,291,731 | Lake | Aug. 4, 1942 |